United States Patent [19]

Russell

[11] Patent Number: 5,486,133
[45] Date of Patent: Jan. 23, 1996

[54] TIMING BELT GRINDING APPARATUS AND METHOD

[76] Inventor: Jerry Russell, 95 Windsor Rd., Rochester, Mich. 48307

[21] Appl. No.: 251,024

[22] Filed: May 31, 1994

[51] Int. Cl.⁶ .................................................. B24B 7/00
[52] U.S. Cl. .................... 451/150; 451/28; 451/131; 451/140; 451/184; 451/189; 451/242; 83/875; 83/862; 83/876; 156/142; 264/162
[58] Field of Search ............................. 451/28, 131, 136, 451/140, 150, 182, 184, 188, 189, 242, 246; 83/875, 876, 878, 862; 156/138, 142; 264/162

[56] References Cited

U.S. PATENT DOCUMENTS

| | | | |
|---|---|---|---|
| 2,144,987 | 1/1939 | Miller | 51/278 |
| 2,669,280 | 2/1954 | Aucustin . | |
| 2,736,145 | 2/1956 | Davidson | 451/246 |
| 3,397,491 | 8/1968 | Keith | 51/34 |
| 3,711,999 | 1/1973 | Held | 51/206 |
| 3,799,824 | 3/1974 | Arnao et al. . | |
| 3,822,516 | 7/1974 | Huber | 51/326 |
| 3,841,034 | 10/1974 | Held | 51/356 |
| 4,237,955 | 12/1980 | Clayton | 157/13 |
| 4,322,916 | 4/1982 | Richmond | 51/78 |
| 4,329,192 | 5/1982 | White et al. | 156/138 |
| 4,534,687 | 8/1985 | Hetz | 409/157 |
| 5,183,521 | 2/1993 | Ruffini et al. | 83/875 |
| 5,214,881 | 6/1993 | Borchardt | 451/188 |

Primary Examiner—Bruce M. Kisliuk
Assistant Examiner—Eileen Morgan
Attorney, Agent, or Firm—Reising, Ethington, Barnard & Perry

[57] ABSTRACT

A toothed timing belt is produced from a belt blank utilizing an apparatus having a belt blank fixturing device for supporting the belt blank for selective indexable rotation about a first axis and a toothed grinding wheel rotatable about a second transverse axis and supported for movement across the width of the belt blank in a direction parallel to the first axis for cutting a series of circumferentially spaced transverse teeth into the belt blank. The belt blank is indexed with each pass of the grinding wheel until the entire belt has been provided with teeth. The toothed belt blank may then be severed about its periphery to provide a plurality of discrete timing belt members.

26 Claims, 4 Drawing Sheets

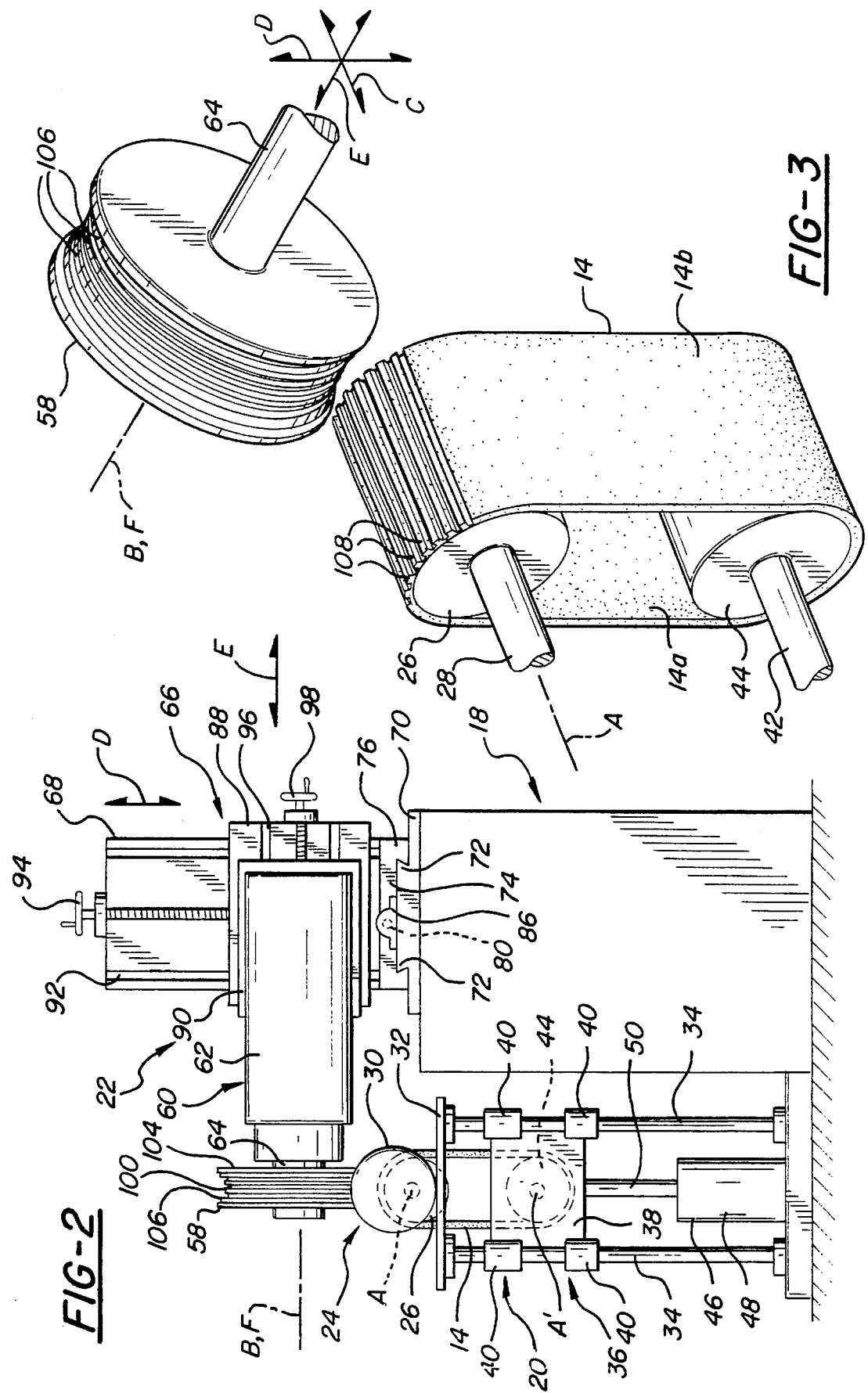

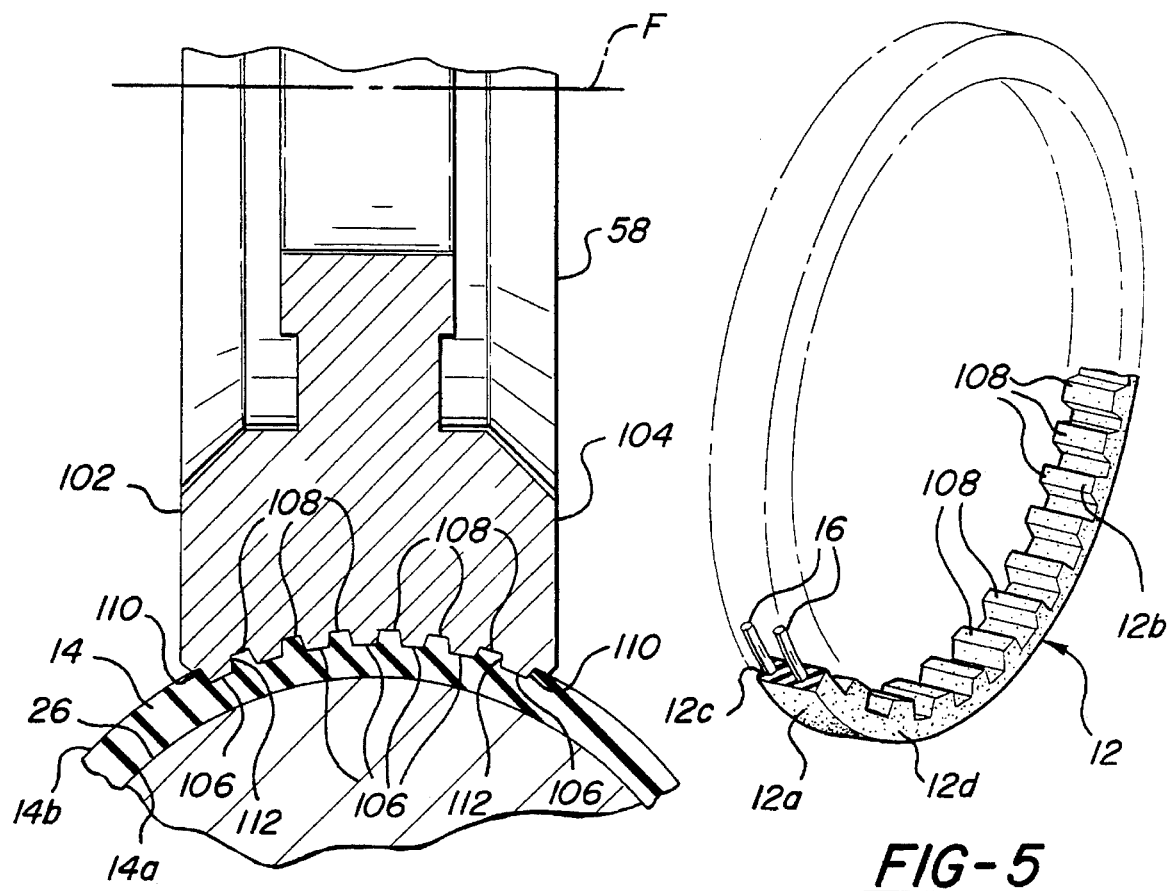
FIG-4
FIG-5
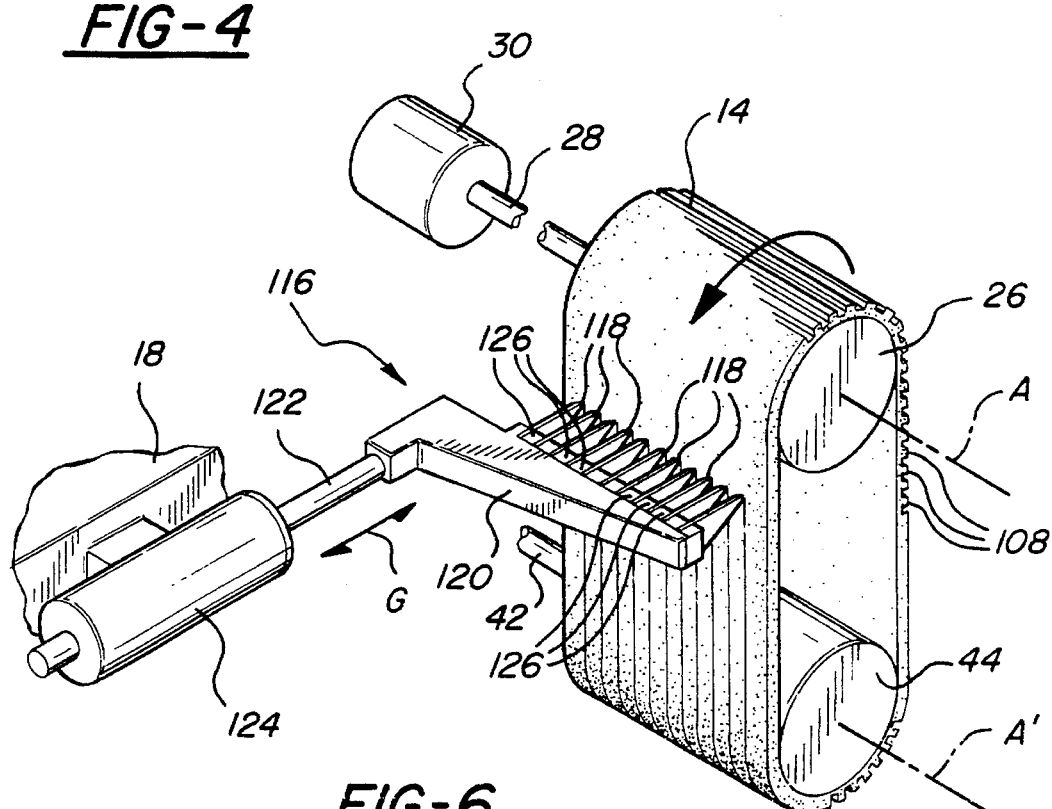
FIG-6

TIMING BELT GRINDING APPARATUS AND METHOD

TECHNICAL FIELD

This invention relates to methods and apparatus for producing timing belts.

BACKGROUND OF THE INVENTION

Power transmitting toothed belts, also known as timing belts, are used for many applications, like driving an engine's camshaft off the crankshaft. The teeth of the belt mesh with corresponding teeth on pulleys mounted the shaft members to prevent slippage and provide synchronized rotation of the driven shaft member (e.g. camshaft) with respect to the driving shaft member (e.g. crankshaft). Such timing belts are lighter in weight than metal power transmission chains and are able to be used in applications requiring the use of small pulleys having small arcs of contact with the belt. At present, however, such timing belts are costly to produce which is believed in part to be attributed to the present process used to manufacture the timing belts namely molding.

Apparatus for cutting teeth into an endless belt blank to produce a timing belt comprises belt support means for supporting the endless blank for selective rotation about a first axis, a cutting wheel having a plurality of peripheral tooth cutting portions spaced laterally from one another, and wheel rotation means for rotating the wheel about a second axis that is transverse to the first axis and translating means for translating the wheel relative to said belt support means across the width of the belt blank along a path generally parallel to the first axis for cutting a plurality of transverse teeth into the belt blank with the tooth cutting portions.

According to another aspect of the invention, a grinding wheel construction for cutting teeth into a belt blank to produce a timing belt comprises a wheel having an axis of rotation and an abrasive peripheral grinding surface of predetermined width, wherein the grinding surface has a concave profile across its width and a plurality of laterally spaced grinding ribs extending circumferentially about the periphery of the grinding surface.

According to yet another aspect of the invention, a method of producing a timing belt comprises the steps of: (a) supporting a belt blank about a first axis with a peripheral surface of the belt blank disposed outwardly; (b) rotating the cutting wheel about a second axis that is transverse to the first axis and translating the wheel along a path and across the outwardly disposed peripheral surface to thereby cut a plurality of teeth into the belt blank extending across the width of the belt in circumferentially spaced relation to one another; (c) indexing the belt blank rotatably about the first axis to bring another uncut portion of the belt blank into the cutting path of the wheel; and (d) repeating steps (c) and (d) until the entire outwardly disposed periphery of the belt blank has been provided with teeth.

The invention enables timing belts to be produced from uncut belt blank stock by cutting the teeth into the belt blank stock to produce the timing belts, at a recognized cost, time, and labor savings over the presently molded timing belts.

BRIEF DESCRIPTION OF THE DRAWINGS

These and other features and advantages of this invention will become more readily understood and appreciated by those skilled in the art when considered in connection with the following detailed description and drawing wherein:

FIG. 2 is a side elevation view of the belt grinding apparatus;

FIG. 3 is an enlarged fragmentary perspective view of a portion of the apparatus;

FIG. 4 is an enlarged fragmentary sectional view of the grinding wheel, belt, and belt support mandrel;

FIG. 5 is a fragmentary perspective view of a timing belt produced by the present invention;

FIG. 6 is a fragmentary perspective view illustrating the optional belt cutting device;

DETAILED DESCRIPTION OF THE PREFERRED EMBODIMENTS

Figure 1:
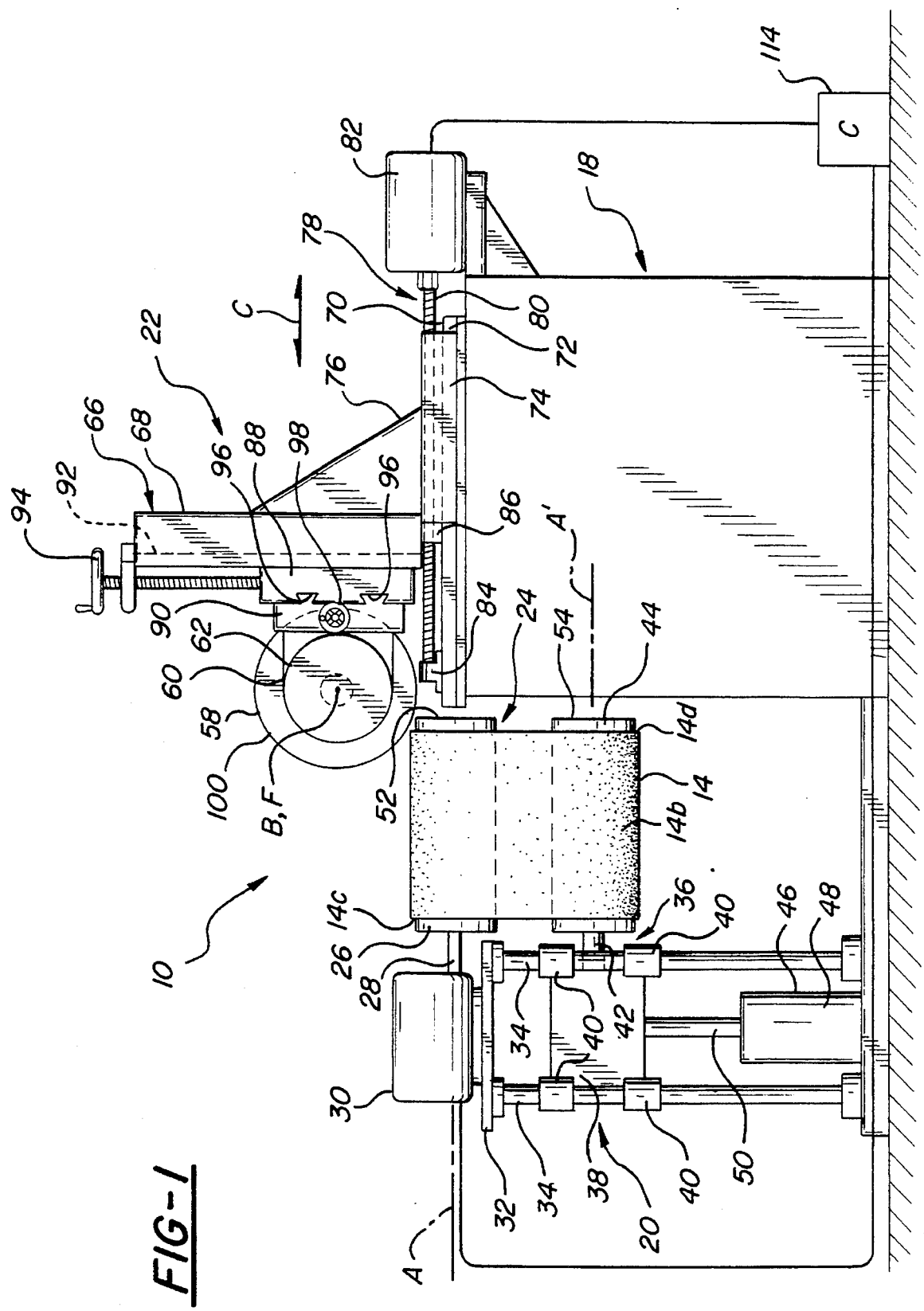
FIG. 1 is a front elevation view of the belt grinding apparatus.

A belt grinding apparatus, constructed according to a presently preferred embodiment of the invention is designated generally at 10 in the drawings and is shown as being adapted for use in producing one or more toothed belts (also known as a timing belt) 12 from an endless flexible belt blank 14. The belt blank material from which the timing belts are produced may be of the type having a rubber core or other suitable material conventionally used for timing belts and embedded in which may be one or more tension carrying cords 16 provided to minimize stretching of the belt during use. The belt blank 14 has opposing peripheral surfaces 14a, 14b corresponding to peripheral surfaces 12a, 12b of the timing belts 12. The peripheral surfaces extend about the circumference of the belt blank 14, and timing belts 12, respectfully, and laterally across their respective widths between opposite side edges 14c, 14d; 12c, 12d. The belt blank 14 is generally rectangular in transverse section and has a uniform thickness and a fixed circumferential length. The belt blank's width may be the same as that of the timing belt 12 or it may have a width selected to be wider than a single timing belt 12 for producing multiple relatively narrower timing belts 12 from a single belt blank 14, as will be described in greater detail below.

The apparatus 10 has a base 18 mounting a belt blank fixturing device 20 and a belt blank tooth cutting device 22. The belt blank fixturing device 20 includes belt blank support means 24 having a cylindrical drive mandrel or drum 26 which may be detachably mounted to a work spindle 28 of an indexable stepper-driven rotary drive motor 30. The motor 30 is operative for selectively rotating the mandrel 26 about a first axis of rotation A in an indexible or continuous manner, as will be described further below. The motor 30 is mounted on an elevated platform 32 supported above the base 18 by four vertical rigid posts 34 projecting upwardly from the base 18.

The belt blank fixturing device 20 also includes belt tensioning means 36 for tensioning the belt blank 14 while supported by the belt support means 24. The belt tensioning means 36 comprises a shuttle or carriage 38 coupled slidably to the posts 34 via four coupling blocks 40 for vertical movement normal to the rotation axis A toward and away from the mandrel 26 or readily available conventional slide assembly. The carriage 38 supports a horizontally extending rotary shaft 42. A cylindrical tensioning mandrel or roller 44 is journaled on the shaft 42 and is freely rotatable about an axis A' of the shaft 42 that is parallel to the rotation axis A and movable with the carriage 38 laterally toward and away from the drive mandrel 26. A double acting-type fluid cylinder or equivalent device, such as a motor-driven screw 46 is provided for positioning and holding the carriage 38 and tensioning mandrel 44 in any one of a number of positions of vertical adjustment along the posts 34. The double acting fluid cylinder 46 comprises a cylinder body 48 mounted on the base 18 beneath the carriage 38 centrally between the posts 34. A vertical extension shaft 50 has an upper end secured to the bottom of the carriage 38 and includes a piston (not shown) adjacent its lower end slidably disposed within an internal chamber (not shown) of the cylinder body 48. Pressurized fluid (e.g. hydraulic fluid under pressure) may be introduced into the chamber either below or above the piston in conventional manner to raise or lower the vertical positioning of the carriage 38, respectively.

The mandrels 26 and 44 have corresponding free ends 52 and 54, respectively, that are unencumbered so as to enable the endless belt blank 14 to be slid onto the mandrels 26, 44 over their free ends 52,54. Once the belt blank 14 is positioned over the mandrels 26, 44, the belt tensioning means 36 is operated to move the tensioning mandrel 44 downwardly away from the drive mandrel 26 to thereby engage the inwardly disposed peripheral surface 14a of the belt blank and apply sufficient tension to the belt blank 14 to prevent it from slipping off the mandrels 26 and 44 during the subsequent belt cutting operation.

The belt blank tooth cutting device 22 includes a cutting or grinding wheel 58 and wheel rotation means 60 mounting the wheel 58 for rotation about a second axis B that is transverse and preferably perpendicular to the first rotation axis A of the drive mandrel 26 about which the belt blank 14 rotates. The wheel rotation means 60 comprises an electric drive motor 62 having a rotary drive spindle 64 extending horizontally along the second axis B and detachably mounting the grinding wheel 58 for rotation with the spindle 64 about the axis B. The motor 62 is supported by translation means 66 for selectively translating or moving the wheel 58 along a cutting path in the direction of double-headed arrow C that is generally parallel to the first axis A of the belt drive mandrel 26.

As shown best in FIGS. 1 and 2, the translation means 66 may comprise a compound three axis way slide assembly 68 supported by the base 18. The way slide assembly 68 includes a primary longitudinal way slide base track 70 secured to the base 18 having linear guide tracks 72 extending in the direction of the cutting path and slidably supporting guided portions 74 of a carriage 76 for movement therealong. A screw drive device 78 or a double acting type fluid cylinder or equivalent device is provided for driving the carriage 76 along the track 70 to move the grinding wheel 58 back and forth along the cutting path. The screw drive device 78 includes a lead screw 80 coupled at one end to a drive motor 82 and supported for rotation at an opposite end by a support block 84 mounted on the base 18. The carriage 76 has a drive nut 86 secured thereto provided with internal screw threads meshing with the threads of the lead screw 80 such that on rotation of the lead screw 80 the nut 86 and hence the carriage 76 is caused to travel in one direction along the length of the lead screw 80, and travel in the opposite direction when rotation of the lead screw 80 is reversed. The motor 82 is preferably a conventional reversible electric motor.

The compound way slide assembly includes additional vertical and lateral slide portions 88 and 90, respectively, to provide additional vertical and lateral adjustment capability to the position of the wheel 58 relative to the axis of rotation A in the direction of double-headed arrows D and E (FIG. 2), respectively. The compound way slide assembly 68 thus provides three axis movement to the wheel 58. The vertical slide 88 is supported by vertical guide tracks 92 mounted on the carriage 76 for vertical sliding movement therealong. A manual screw drive device 94 or motorized, or double acting-type fluid cylinder or equivalent device is provided for adjusting the vertical position of the slide 88 along guide track 92 in the direction of arrows D. The lateral slide 90 is slidable along lateral guide tracks 96 provided in vertical slide 88 for horizontal lateral movement therealong perpendicular to the rotation axis A in the direction of arrows E. A similar manual screw drive device 98 or motorized, or double acting-type fluid cylinder or equivalent device is supported on the vertical slide 88 and operatively coupled to the lateral slide 90 for adjusting the lateral positioning of the slide 90 along guide tracks 96.

The grinding wheel 58 is generally cylindrical in configuration and provided with an abrasive outer peripheral grinding surface 100. The wheel 60 has a central axis F extending along the second axis B when the wheel 58 is mounted on the drive spindle 64. The grinding surface 100 extends across the width of the wheel 58 between opposite parallel ends 102 and 104 of the wheel 58 that are normal to the axis F. The grinding wheel 58 may comprise an abrasive wheel wherein at least the grinding surface 100 is fabricated of abrasive particulate material. As shown best in FIG. 4, the grinding surface 100 is provided with a plurality of tooth cutting portions or grinding teeth in the preferred form of radially outwardly projecting annular grinding ribs 106 extending about the circumference of the grinding surface 100 and spaced laterally from one another across the width of the wheel 58 for removing waste material from the outer peripheral surface of the belt blank 14 to provide a corresponding plurality of teeth 108 in the belt blank 14 and hence the timing belt 12.

Each of the grinding ribs 106 have lateral outer and inner side faces 110, 112 that are inclined relatively toward one another in the radially outward direction of the ribs 106 to provide a taper to each rib 106 and a corresponding inverse taper to the belt teeth 108.

As also seen best in FIG. 4, the grinding surface 100 has an enveloping or concave transverse profile across the width of the grinding surface 100 such that the grinding ribs 106 are disposed along an inwardly curving arc that is selected to correspond in curvature substantially to that of the outer peripheral surface portion of the belt blank 14 wrapped around and directly engaging the drive mandrel 26. In this way, the mandrel 26 underlies and supports the portion of the belt blank 14 being cut by the wheel 58. The number of grinding ribs 106 that may be provided for a given width wheel is governed in part by the concave curvature of the grinding surface 100, in that the angle of the laterally innermost side face 112 of the two outermost grinding ribs 106 may not be inclined inwardly beyond vertical or else the belt blank 14 would be undercut by that portion of the ribs. In other words, the aforementioned inner side faces 112 may incline outwardly toward the respective adjacent ends 102 and 104 of the wheel 58 or may be parallel to the ends 102, 104, but may not angle toward one another away from the adjacent ends 102, 104.

To produce a timing belt 12 like the one illustrated in FIG. 5, the belt blank 14 is supported by the belt blank fixturing device 20 by sliding the belt blank 14 over the free ends 52, 54 of the mandrels 26, 44 and operating the belt tensioning means 36 to slide the tensioning mandrel 44 downwardly away from the drive mandrel 26 such that the inwardly disposed peripheral surface 14a of the belt blank 14 is engaged by each of the mandrels 26 and 44 and the belt blank 14 is being taut between the mandrels 26, 44, as illustrated in FIGS. 1–2. When supported by the fixturing device 20, a portion of the belt blank 14 wraps around and directly engages the drive mandrel 26, as illustrated in FIG. 4, such that the outwardly disposed peripheral surface 14b of the belt blank 14 is supported in an arc, as shown.

Once the belt blank 14 is supported in the fixturing device 20, appropriate adjustments are made to the lateral and vertical slide members 90, 88 to position the grinding wheel 58 relative to the belt blank 14 and belt blank fixturing device 20 such that the axis A lies in the central plane of the grinding wheel 58 and the grinding surface 100 positioned vertically as in FIG. 4 so as to engage the outwardly disposed peripheral surface 14b of the belt blank 14 with the grinding surface 100 of the wheel 58 when moved relatively across one another.

Once the appropriate vertical and lateral adjustments have been made to the position of the grinding wheel 58, the motor 82 is operated to translate the rotating grinding wheel 58 in the direction of arrow C across the width of the belt blank 14 to thereby cause the grinding ribs 106 to grind away and remove waste material from the peripheral surface 14a of the belt blank 14 producing the teeth 108 that extend across the width of the belt blank 14 and are spaced laterally from one another in the direction of the circumference of the belt blank. Once the grinding wheel 58 has made a pass across the width of the belt blank 14, the mandrel drive motor 30 is operated to index the belt blank 14 rotatably about the axis A to bring a next successive uncut portion of the belt blank 14 into the path of the grinding wheel 58, after which the motor 82 is operated to again translate the grinding wheel 58 across the width of the belt to produce another successive set of teeth 108. The indexing and translating steps are repeated until the entire outer peripheral surface of the belt blank 14 has been provided with such teeth 108. The indexing and translating operations are timed in relation to one another may be controlled manually or under the control of a suitable programmable controller 114.

Once the teeth 108 have been cut into the belt blank 14, the belt blank 14 may be further cut along its peripheral length entirely about the circumference of the belt blank at a plurality of laterally spaced locations, as illustrated in FIG. 6, by suitable cutting means 116 to sever the belt blank 14 into a plurality of discrete individual timing belt members 12, each having a width relatively narrower than that of the belt blank 14. As shown by way of example in FIG. 6, the belt blank 14 is cut into 12 individual timing belt members.

The cutting means 116 comprises a plurality of cutting knives 118 mounted on an arm 120 and spaced laterally from one another by spacer blocks 126 provided between each adjacent pair of knives 118 corresponding in width to the width of the timing belt members to be formed. The number and spacing of the knives 118 may be varied by usage of different size spacer blocks to obtain the desired width of the timing belt members 12. The arm 120 is in turn attached to an actuating device such as to an extension shaft 122 of a fluid cylinder actuator 124 mounted on the base 18 and operable for moving the knives 118 into and out of contact with the belt blank 14 along double headed arrow G.

To utilize the cutting means 116, the motor 30 is operated to rotate the drive mandrel 26 and hence the belt blank 14 continuously and at a high rate of speed. The fluid cylinder actuator 124 also is operated to extend the spaced apart cutting knives 118 into cutting engagement with the rotating belt blank 14 to cut the blank 14 into the individual timing belt members 12. The motor 30 is thus indexable to enable incremental rotation of the belt during the tooth cutting operation and also continuously rotatable at a relatively higher rate of speed to assist in the severing operation of the belt blank 14 into the individual timing belt members 12.

After the teeth 108 have been cut into the belt blank 14 and the belt blank 14 severed into the individual timing belt members 12, the timing belt members 12 are removed from the belt fixturing device 20 by raising the belt tensioning mandrel 44 to relieve tension on the belt members 12 and sliding the belt members 12 off the mandrels 26, 44 after which the belt members 44 may be inverted so that the teeth 108 face inwardly, as illustrated in FIG. 5.

Figure 7:
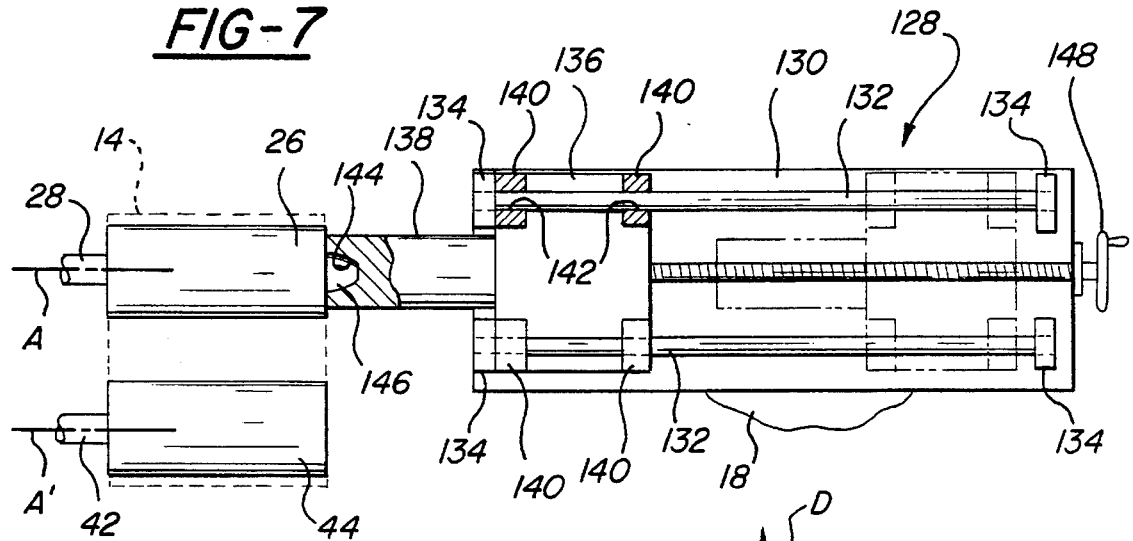
FIG. 7 is a fragmentary front elevation view, shown partly in section, illustrating the optional mandrel support device.

FIG. 7 illustrates mandrel support means 128 that may be utilized to provide additional support to the drive mandrel 26. As illustrated in FIG. 1, the drive mandrel 26 is supported at one end by the spindle 28 of the drive motor 30, however, its opposite end is unsupported. In applications where the belt blank 14 is fairly narrow in width, the support provided by the spindle 28 may be sufficient. However, if a very wide belt blank 14 (and hence a correspondingly wide mandrel 26) is to be supported, it may be necessary to provide additional support to the free end 52 of the mandrel 26 to further support and stabilize the mandrel 26 during the tooth cutting and belt severing operations.

The mandrel support means 128 comprises an elongate support frame or bed 130 secured to the base 18 of the apparatus 10 and including a pair of longitudinal tracks 132 supported above the bed 130 by mounting blocks 134 and extending parallel to one another in the rotation axis A of the mandrel 26. A shuttle carriage 136 having a mandrel engaging portion 138 is supported for sliding movement along the tracks 132 by support blocks 140. The blocks 140 are secured to the shuttle carriage 136 and have aligned openings 142 through which the tracks 132 extend to couple the carriage 136 slidably to the tracks 132. The mandrel engaging portion 138 is provided with a recess 144 in a free end of the portion 138 for receiving a correspondingly shaped projection 146 provided on the free end 52 of the mandrel 26 to thereby provide support to the free end of the mandrel 26.

Means are provided for moving the carriage 136 between a disengaged position in which the mandrel engaging portion 138 is retracted and spaced from the free end of the mandrel 26 (broken chain lines in FIG. 7), and a mandrel supporting position (said lines in FIG. 7) in which the mandrel engaging portion 138 is extended toward and into engagement with the mandrel 26 such that the projection 146 is received within the recess 144, as illustrated. The means for moving the carriage 136 along the tracks 132 may comprise a manual screw drive device 148 or motor driven or hydraulically or pneumatically actuated equivalent device of the same general type as those employed for controlling movements of the compound way slide components 68 described above.

In use, the belt blank 14 is slid over the free ends 52, 54 of the mandrels 26 and 44 in the same manner as described previously, and the carriage 136 thereafter moved into the mandrel engaging position to support the free end of the drive mandrel 26. The reverse operations are performed to remove the belt blank 14 from the mandrels 26, 44.

Figure 8:
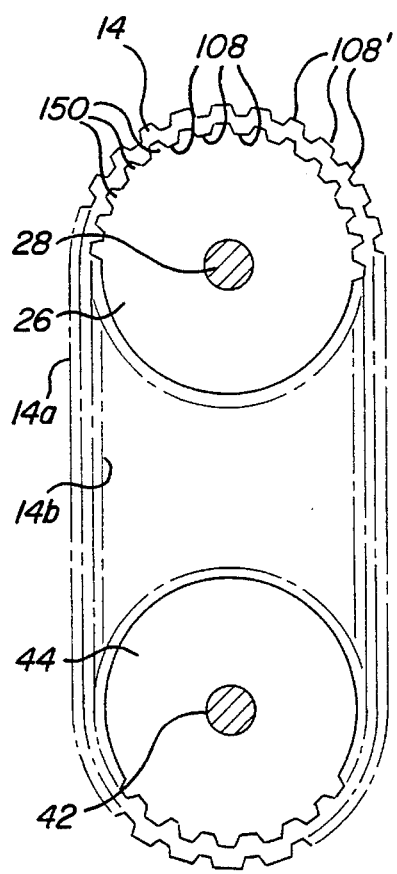
FIG. 8 is an enlarged fragmentary side elevation view of alternative belt support and tensioning mandrels for use with the apparatus of FIG. 1 and 2.

FIG. 8 illustrates an alternative mandrel design in which the drive mandrel 26 and tensioning mandrel 44 are provided with external teeth 150 circumferentially spaced above the outer periphery of the mandrels and extending across their respective widths. The teeth 150 are configured to mesh with the teeth 108 cut into the belt blank 14 after the belt blank 14 has been inverted, such that the teeth 108 project inwardly, as illustrated in FIG. 8. Supporting the belt blank 14 in the inverted manner positions the opposing uncut peripheral surface 14a of the belt blank 14 on the outer periphery of the belt blank 14 enabling additional transverse teeth 108' to be cut, if desired, into the peripheral surface 14a of the belt blank in the same manner as that described previously for the cutting of teeth into the first peripheral surface 14b. The result is a belt blank 14 having transverse circumferentially spaced teeth 108 and 108' provided on opposite respective surfaces 14b, 14a of the belt blank 14. The belt blank 14 may be severed into individual timing belt members 12 in the same manner as previously described.

Figure 9:
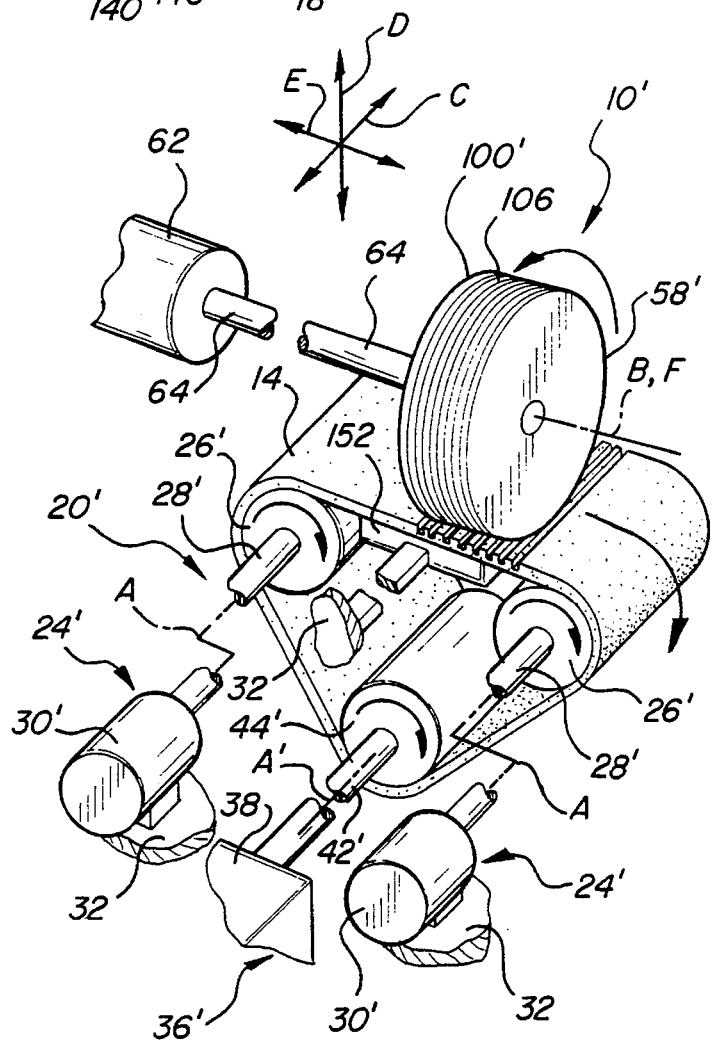
FIG. 9 is a fragmentary perspective view of an alternative belt support and tensioning system for supporting the belt blank during grinding.

FIG. 9 shows an alternative embodiment of the apparatus designated generally at 10' in which an alternative grinding wheel configuration 58' mounted on the same motor driven spindle 64, which is in turn supported by the same wheel translation means 66 and base 18 as that described previously to provide rotary movement to the wheel as well as translational movement in the directions of double headed arrows C, D, and E. The grinding wheel 58' is similarly provided with a plurality of circumferentially extending laterally spaced grinding ribs 106 of the same general configuration as those described previously, however, the grinding surface 100' is flat and generally parallel to the central axis F of the wheel 58', rather than being concave in profile like the wheel 58.

The belt blank fixturing device 20' is similar in function but different in construction. The belt support means 24' includes a pair of drive mandrels 26' each mounted on a spindle 28' of a pair of drive motors 30' of the same indexable type as that described previously for the belt support means 24. The motors 30' are mounted on the platform 32 in laterally spaced horizontal relation to one another as shown in FIG. 9.

The belt tensioning means 36' comprises a tensioning or idler mandrel 44' freely journaled about a shaft 42' projecting from the carriage 38 and movable in the same vertical manner toward and away from the drive mandrels 26' in the same manner as that of the tensioning mandrel 44 described previously.

The belt blank 14 is mounted on a fixturing device 20' in similar fashion by sliding the belt blank 14 over free ends of the mandrels 26' and 44' and then lowering the tensioning mandrel 44 to engage and tension the belt blank 14 in the same manner.

A rigid support plate 152 is secured to the platform 32 and is disposed between the drive mandrels 26' as illustrated in FIG. 9. The support plate 152 engages and supports the inwardly disposed peripheral surface 14a of the belt blank 14. The grinding wheel 58' is translated across the width of the belt blank 14 along a guide path parallel to the rotation axes A of the drive mandrels 26' and over the support plate 152 for cutting the transverse teeth 108 into the outwardly disposed peripheral surface 14b of the belt blank overlying the support plate 152. In contrast to the first embodiment, the wheel 58' passes between the drive mandrels 26' to cut the teeth 108 into a flat portion of the belt blank 14 overlying the support plate 152, rather than translating the wheel 58 directly over the mandrel 26 to cut the teeth 108 into an arcuately disposed portion of the belt blank 14 overlying the mandrel 26. The first embodiment requires usage of a grinding wheel having described concavely shaped grinding surface 100 as opposed to the square profiled grinding surface 100' utilized for the apparatus 10'.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. Apparatus for cutting teeth into an endless belt blank (14) of predetermined width to produce a timing belt (12), said apparatus comprising:

belt support means (24, 24') for supporting the endless belt blank (14) for selective rotation about a first axis (A);

a cutting wheel (58, 58') having a plurality of peripheral tooth cutting portions (106, 106') spaced laterally from one another;

and characterized by wheel rotation means (60) for rotating said wheel (58, 58') about a second axis (B) transverse to said first axis (A) and translating means (66) for translating said wheel (58, 58') relative to said belt support means (24, 24') across the width of the belt blank (14) along a path generally parallel to said first axis (A) for cutting a plurality of transverse teeth (108) into the belt blank (14) with said tooth cutting portions (106, 106').

2. The apparatus of claim 1 further characterized by including indexing means (30) for indexing said belt blank (14) rotatably about said first axis (A) in timed relation to said movement of said cutting wheel (58, 58') for positioning consecutive uncut portions of the belt blank (14) along said cutting path of said wheel (58, 58') for cutting additional transverse teeth (108) into the uncut portions of the belt blank (14) with each consecutive pass of said cutting wheel (58, 58') across the belt blank (14).

3. The apparatus of claim 2 further characterized by said indexing means (30) comprising an indexible motor (30).

4. The apparatus of claim 3 further characterized by including belt tensioning means (36, 36') movable laterally relative to said belt support means (24, 24') for engaging and tensioning the belt blank (14) during the cutting operation.

5. The apparatus of claim 4 further characterized by said belt support means (24, 24') and said belt tensioning means (36, 36') comprising a pair of first (26, 26') and second (44, 44') laterally spaced rotatable mandrels, respectively, for engaging an inner peripheral surface of the belt blank (14).

6. The apparatus of claim 5 further characterized by said belt tensioning means (36, 36') including a carriage (38) supporting said second mandrel (44, 44') for selective lateral movement relative to said first mandrel (26, 26').

7. The apparatus as of claim 5 further characterized by said first mandrel (26, 26') being coupled to said indexing means (30) for selective rotation thereby about said first axis (A).

8. The apparatus of claim 7 wherein said first mandrel (26, 26') has a free end (52) and including mandrel support means (128) movable into selective supporting engagement with said free end (52).

9. The apparatus of claim 1 including cutting means (116) for cutting the belt blank (14) circumferentially along its length to produce at least two individual disconnected timing belt members (12).

10. The apparatus of claim 9 further characterized by said cutting means (116) comprising a cutting knife (116) having a plurality of cutting blades (118) spaced laterally from one another and movable selectively toward and into cutting engagement with the belt blank (14).

11. The apparatus of claim 10 further characterized by said indexing means (30) including a motor (30) coupled to said first mandrel (26, 26') and operable in a cutting mode to continuously rotate said belt blank (14) in coordination with said movement of said cutting means (116) to cut the belt blank (14) into the individual timing belt members (12).

12. The apparatus of claim 1 further characterized by said cutting wheel (58, 58') comprising a grinding wheel having a peripheral grinding surface (100, 100') of predetermined width fabricated of abrasive particulate material.

13. The apparatus of claim 12 further characterized by said grinding surface (100, 100') including a plurality of annular grinding ribs (106, 106') extending circumferentially about the periphery of said grinding surface (100, 100') and spaced laterally across the width of said grinding surface (100, 100').

14. The apparatus of claim 13 further characterized by said grinding surface (100), including said ribs (106), having a generally concave profile across the width of the grinding surface (100).

15. The apparatus of claim 14 further characterized by said grinding ribs (106) each having a pair of spaced lateral side faces (110, 112) inclined relatively toward one another in the radially outward direction of said wheel (58).

16. The apparatus of claim 1 further characterized by said translation means (66) including lateral adjustment means (88, 90) for selectively adjusting the position of said wheel (58, 58') laterally of said cutting path.

17. The apparatus of claim 1 further characterized by said first and second mandrels (26, 26'; 44, 44') having external circumferentially spaced belt-engaging teeth (150).

18. The apparatus of claim 4 further characterized by said belt support means (24') comprising a pair of laterally spaced drive mandrels (26') supporting said belt blank (14) for rotation about said first axis (A) and a rigid support plate (152) disposed between said drive mandrels (26') adjacent said wheel (58') for supporting a portion of the belt blank 14 spanning said drive mandrels (26').

19. The apparatus of claim 18 further characterized by said belt tensioning means (36') comprising a third idler mandrel (44') spaced from said drive mandrels (26') and said support plate (152).

20. A method of producing a timing belt from an endless belt blank of predetermined width, said method comprising the steps of:
 a) supporting the belt blank about a first axis with a peripheral surface of the belt blank disposed outwardly;
 b) rotating a cutting wheel about a second axis that is transverse to the first axis and translating the cutting wheel relative to the belt blank along a path across the outwardly disposed peripheral surface of the belt blank to thereby cut a plurality of teeth into the belt blank extending across the width of the belt blank in circumferentially spaced relation to one another;
 c) indexing the belt blank rotatably about the first axis to bring a next uncut portion of the belt blank into the path of the wheel; and
 d) repeating steps b) and c) until the entire outwardly disposed periphery of the belt blank has been provided with teeth.

21. The method of claim 20, wherein the outwardly disposed peripheral surface of the uncut portion is arcuate, and the cutting wheel has a peripheral grinding surface that is concave in profile across the width of the wheel having a curvature selected to correspond inversely to the curvature of the arcuate uncut portion and includes a plurality of circumferentially extending laterally spaced grinding ribs for forming the teeth, the method further characterized by moving the concave grinding surface of the grinding wheel across the width of the uncut arcuate portion of the belt blank to thereby cut the teeth into the uncut arcuate portion.

22. The method of claim 20 including cutting the toothed belt at laterally spaced locations across the width of the belt to produce a plurality of individual timing belts.

23. The method of claim 20 including inverting the belt such that the teeth project radially inwardly and an opposite peripheral surface of the belt is disposed outwardly.

24. The method of claim 23 including repeating steps a)–d) to provide teeth on both peripheral surfaces of the belt.

25. The method of claim 20 including cutting the belt blank about its periphery at multiple laterally spaced locations after the teeth have been cut into the belt blank to produce a plurality of discrete timing belt members each having a width relatively narrower than that of the belt blank.

26. The method of claim 25 including continuously rotating the belt blank about the first axis while extending a plurality of cutting knives into engagement with the belt blank to cut the belt blank into the discrete timing belt members.

* * * * *